United States Patent
Bonnet et al.

(10) Patent No.: US 6,526,183 B1
(45) Date of Patent: Feb. 25, 2003

(54) STATIC IMAGE GENERATION METHOD AND DEVICE

(75) Inventors: Michel Bonnet, Paris (FR); Oriol Sans Estrada, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/366,695

(22) Filed: Aug. 4, 1999

(30) Foreign Application Priority Data

Aug. 5, 1998 (EP) .......................................... 98401997
Jun. 22, 1999 (EP) .......................................... 99401546

(51) Int. Cl.[7] .............................. G06K 9/36; G09G 5/00
(52) U.S. Cl. ...................... 382/284; 382/276; 345/683
(58) Field of Search ............................... 382/173, 236, 382/243, 276, 284, 285, 308, 293, 294, 296, 260; 375/240.16; 345/629, 639, 640, 646, 648, 683; 348/416.1, 407.1, 413.1, 155

(56) References Cited

U.S. PATENT DOCUMENTS 5,943,445 A * 8/1999 Dufaux ....................... 382/236
5,999,662 A * 12/1999 Burt et al. ................... 382/284
6,037,988 A * 3/2000 Gu et al. ................. 375/240.16

* cited by examiner

Primary Examiner—Bhavesh Mehta
Assistant Examiner—Kanji Patel
(74) Attorney, Agent, or Firm—Russell Gross

(57) ABSTRACT

The invention relates to a method and device for generating a large static image $M(n)$, such as a sprite or a mosaic, from a video sequence including successive video objects. This method comprises a first step for estimating motion parameters related to the current video object $VO(n)$ of the sequence with respect to the previously generated static image $M(n-1)$, a second step for warping this video object on the basis of the estimated motion parameters, a third step for blending the warped video object thus obtained with the previously generated static image $M(n-1)$, and a fourth step for computing, for each picture element of the current video object, a weighting coefficient $W_{WF(n)}[x,y]$ correlated to the error between the warped video object and the static image $M(n-1)$, the blending formula then taking into account said weighting coefficients. According to the invention, the pixel-based weighting map is converted into a region-based one by means of a spatial filtering step based on a morphological segmentation, which allows to select regions that belong to foreground objects and to discard them as outliers before the blending step.

3 Claims, 2 Drawing Sheets

STATIC IMAGE GENERATION METHOD AND DEVICE

The invention relates to a method for generating a large static image M(n), such as a sprite or a mosaic, from a video sequence including successive video objects VOs, said method comprising the steps of:

(A) estimating motion parameters related to the current video object V0(n) of the sequence, with respect to the previously generated static image M(n−1)

(B) warping said current video object V0(n), on the basis of said estimated motion parameters;

(C) blending the warped video object WV0(n) thus obtained with the previously generated static image M(n−1) and to a corresponding device. This invention may be useful in relation with the MPEG-4 and MPEG-7 standards.

BACKGROUND OF THE INVENTION

The descriptors and description schemes that will be standardized within the frame of MPEG-7 (MPEG-7 has for object to standardize within some years generic ways to describe multimedia content) will allow fast and efficient retrieval of data, on the basis of various types of features such as text, color, texture, motion and semantic content. In this MPEG-7 context, a mosaic can play a useful role. As indeed explained for instance in the article "Efficient representations of video sequences and their applications", M. Irani and al., Signal Processing: Image Communication, vol.8, 1996, pp.327–351, a mosaic image is constructed from all frames in a scene sequence, giving a panoramic view of said scene. It is possible to extract for instance from this panoramic view the main features of the sequence, such as chrominance or luminance histograms, objects shapes, global motion parameters, and so on.

The definition of a mosaic may be compared to that of a sprite, as used in the context of the MPEG-4 standard. A sprite is a large static image composed of the picture elements (pixels) in an object visible through an entire sequence. This static image forms a panoramic view whose some portions may not be visible in some frames because of foreground objects or camera motion. If all the relevant pixels throughout the entire sequence are collected, a complete panoramic view (called precisely background sprite) is obtained, which can be efficiently transmitted (or stored) and used later for re-creating portions of frames.

As described for instance in the case of a sprite in the document WO 98/59497, which can be also applied to the case of a mosaic, three main steps may compose a sprite or mosaic generation (in the following, the generic word "static image" will therefore be used in place of sprite or mosaic). A motion estimation step is first provided, in order to find the motion parameters that allow to merge correctly a current frame F(n), or video objects in a current frame F(n), with the static image M(n−1) already composed of the previous frames F(1), F(2), . . . , F(n−1), or of the previous video objects in the previous frame. The inverse parameters are then computed, so that the current frame may be compensated in their direction; this second step is also called warping. The warped current frame F(n) is finally blended with M(n−1) in order to form a new accreted static image M(n), with which the next incoming frame F(n+1) will be merged, and so on.

A static image generation method showing a better robustness to outliers (pixels that do not follow the global motion and correspond to objects having their own motion) has already been proposed in a European patent application previously filed by the applicant with the filing number 98401997.6. With respect to the method described in the document WO 98/59497, this improved method comprises, between the mentioned warping and blending steps, an additional fourth step for computing, for each picture element of the current video object V0(n), a weighting coefficient $W_{WF(n)}[x,y]$ correlated to the error between the warped video object WV0(n) and the static image M(n−1) at each picture element [x,y]. The blending formula then used for each pixel [x,y] for determining the newly generated static image M(n) takes into account said weighting coefficients:

$$M(n)[x, y] = \frac{w_{M(n-1)}[x, y] \cdot M(n-1)[x, y] + w_{WF(n)}[x, y] \cdot WF(n)[x, y]}{w_{M(n-1)} + w_{WF(n)}} \quad (1)$$

(the definitions of the terms are given hereunder).

A device for the implementation of this improved method, for instance in the case of a mosaic, is illustrated in FIG. 1. A motion estimation stage 11, receiving successive video objects, in the present case successive frames F(1), F(2), F(3), . . . , F(i), . . . , F(n−1), F(n), estimates the motion parameters allowing to merge the incoming frame F(n) with the previously generated mosaic M(n−1) available in a memory 12 and already incorporating the previous frames F(1) to F(n−1).

An example of said estimation of motion parameters carried out in the stage 11 is for instance described in the document EP 0771115 (PHF96534). The values (Dx, Dy) designating the components of a motion vector from a frame to the following one, with Dx and Dy being functions of x and y whose coefficients are the requested motion parameters, it can be written L(x,y,t)=L(x−Dx, y−Dy, t−1), where t=time and L=luminance at a given point. The number of the coefficients defining the functions depends on the type of motion model considered (different motion models can be used, the motion being in fact represented by the displacements of a given number of points).

Once said motion estimation is done, a mosaic accretion stage 13 allows to warp the current frame F(n) and blend it with the mosaic. This stage 13 comprises the following circuits: a warping circuit 131, a blending circuit 135 and, between them, a pixel-based weighting circuit, that computes for every pixel a weighting coefficient $W_{WF(n)}$ given by the expression (2):

$$w_{WF(n)}[x, y] = \frac{1}{r(x, y)} \frac{d}{dr}\rho(r(x, y)) \quad (2)$$

where ρ is the lorentzian M-estimator used in the motion estimation stage 11 and r(x,y) is the error between the warped current image and the mosaic at the pixel (x,y). In the pixel-based weighting circuit, the construction of the whole error map is done in an error map definition circuit 132 and the computation of the weighting coefficients in a coefficient computation circuit 133. The whole set of weighting coefficients thus computed by the pixel-based weighting circuit (132, 133) is then used by the blending circuit 135. In said circuit, the blending formula used to calculate the luminance and chrominance values of the new mosaic M(n) resulting from the blending step and taking into account the weighting coefficients $W_{WF(n)}[x,y]$ is, for each pixel [x,y], the formula (1), where the definitions of the terms are the following:

(a) n>0;
(b) whatever (x,y), $W_{M(0)}=0$;
(c) whatever (x,y);

$$w_{WF(n)}[x, y] = \frac{1}{r(x, y)} \frac{d}{dr} \rho(r(x, y));$$

(d) $W_{M(n)} = W_{M(n-1)} + W_{WF(n)}$;

ρ being a lorentzian M-estimator used in the motion estimation step.

During the accretion process, composed of the steps A, B, C and carried out for each pixel, some objects are not well detected as foreground and only some of their pixels are considered as outlier information. The technical solution according to the invention is a way of finding connected outlier zones to give them a weak weight, by means of an additional preprocessing step that consists of a segmentation of the image into regions to detect such outlier zones. The proposed method is based on connected operators, that are able to filter a signal by merging its flat zones. This kind of filtering offers the advantage of simplifying the image, because some components are removed, while perfectly preserving the contour information concerning the components that are not removed.

SUMMARY OF THE INVENTION

It is an object of the invention to propose, with respect to such implementations, a static image generation method showing a still increased robustness to outliers.

To this end, the invention relates to a method such as described in the introductory paragraph of the description and which is moreover characterized in that:

(1) said method also comprises, between said warping and blending steps, an additional step itself including:
   a first pixel-based error map definition sub-step, provided for constructing, for each picture element [x,y] of the current video object V0(n), a map of the error r(x,y) between the warped video object WV0(n) and the static image M(n−1) at said picture element [x,y];
   a second spatial filtering sub-step, provided for transforming said pixel-base error map into a region-based error map;
   a third weighting sub-step, provided for computing for every pixel a weighting coefficient $W_{WF(n)}[x,y]$ correlated to said error and in the same time for selecting regions that belong to foreground objects and discarding them as outliers before the blending step;

(2) the blending step provided for determining the newly generated static image M(n) takes into account said weighting coefficients according to the following blending formula, used for each pixel [x,y]:

$$M(n)[x, y] = \frac{^wM(n-1)[x, y] \cdot M(n-1)[x, y] + {}^wWF(n)[x, y] \cdot WF(n)[x, y]}{^wM(n-1) + {}^wWF(n)}$$

where the definitions of the terms are the following:
(a) n>0;
(b) whatever (x,y), $W_{M(0)}=0$;
(c) whatever (x,y);

$$w_{WF(n)}[x, y] = \frac{1}{r(x, y)} \frac{d}{dr} \rho(r(x, y));$$

(d) $W_{M(n)} = WM(n-1) + W_{WF(n)}$;

ρ being a lorentzian M-estimator used in the motion estimation step.

During the accretion process, composed of the steps A, B, C and carried out for each pixel, some objects are not well detected as foreground and only some of their pixels are considered as outlier information. The technical solution according to the invention is a way of finding connected outlier zones to give them a weak weight, by means of an additional preprocessing step that consists of a segmentation of the image into regions to detect such outlier zones. The proposed method is based on connected operators, that are able to filter a signal by merging its flat zones. This kind of filtering offers the advantage of simplifying the image, because some components are removed, while perfectly preserving the contour information concerning the components that are not removed.

It is another object of the invention to propose a static image generation device for carrying out said method.

To this end, this invention relates to a device for generating a large static image M(n), such as a sprite or a mosaic, from a video sequence including successive video objects VOs, said device comprising:

(A) a motion estimation circuit, provided for estimating a motion information related to the relative motion between the current video object of the sequence and the previously generated static image M(n−1);

(B) a warping circuit, provided for defined on the basis of said current video object and said motion information a warped video object WV0(n);

(C) a blending circuit, provided for updating the static image, said previously generated static image M(n−1) being replaced by the new one M(n) generated by blending M(n−1) and said warped video object; characterized in that:

(1) said device also comprises a region-based weighting circuit, receiving the current video object and the associated motion information and itself including:
   a pixel-based error map definition circuit, provided for constructing, for each picture element (x,y) of said current video object, a map of the error r(x,y) between the warped video object and the previous static image M(n−1) at said picture element [x,y];
   a spatial filtering circuit, provided for transforming said pixel-based error map into a region-based error map;
   a weighting circuit, provided for computing for every pixel a weighting coefficient $W_{WF(n)}[x,y]$ correlated to said error and in the same time for selecting regions that belong to foreground objects and discarding them as outliers before the blending step;

(2) the blending formula used in the blending circuit for determining the newly generated static image M(n) takes into account the computed weighting coefficients according to the following blending formula, used for each pixel [x,y];

$$M(n)[x, y] = \frac{{}^wM(n-1)[x, y] \cdot M(n-1)[x, y] + {}^wWF(n)[x, y] \cdot WF(n)[x, y]}{{}^wM(n-1) + {}^wWF(n)}$$

where the definitions of the terms are the following:
(a) n>0;
(b) whatever (x,y), $W_{M(0)}=0$;
(c) whatever (x,y);

$$M(n)[x, y] = \frac{{}^wM(n-1)[x, y] \cdot M(n-1)[x, y] + {}^wWF(n)[x, y] \cdot WF(n)[x, y]}{{}^wM(n-1) + {}^wWF(n)}$$

(d) $W_{M(n)}=W_{M(n-1)}+W_{WF(n)}$;
ρ being a lorentzian M-estimator used in the motion estimation circuit.

BRIEF DESCRIPTION OF THE DRAWINGS

The particularities and advantages of the invention will now be explained in a more detailed manner, with reference to the accompanying drawings in which.

DESCRIPTION OF THE INVENTION

Figure 2:
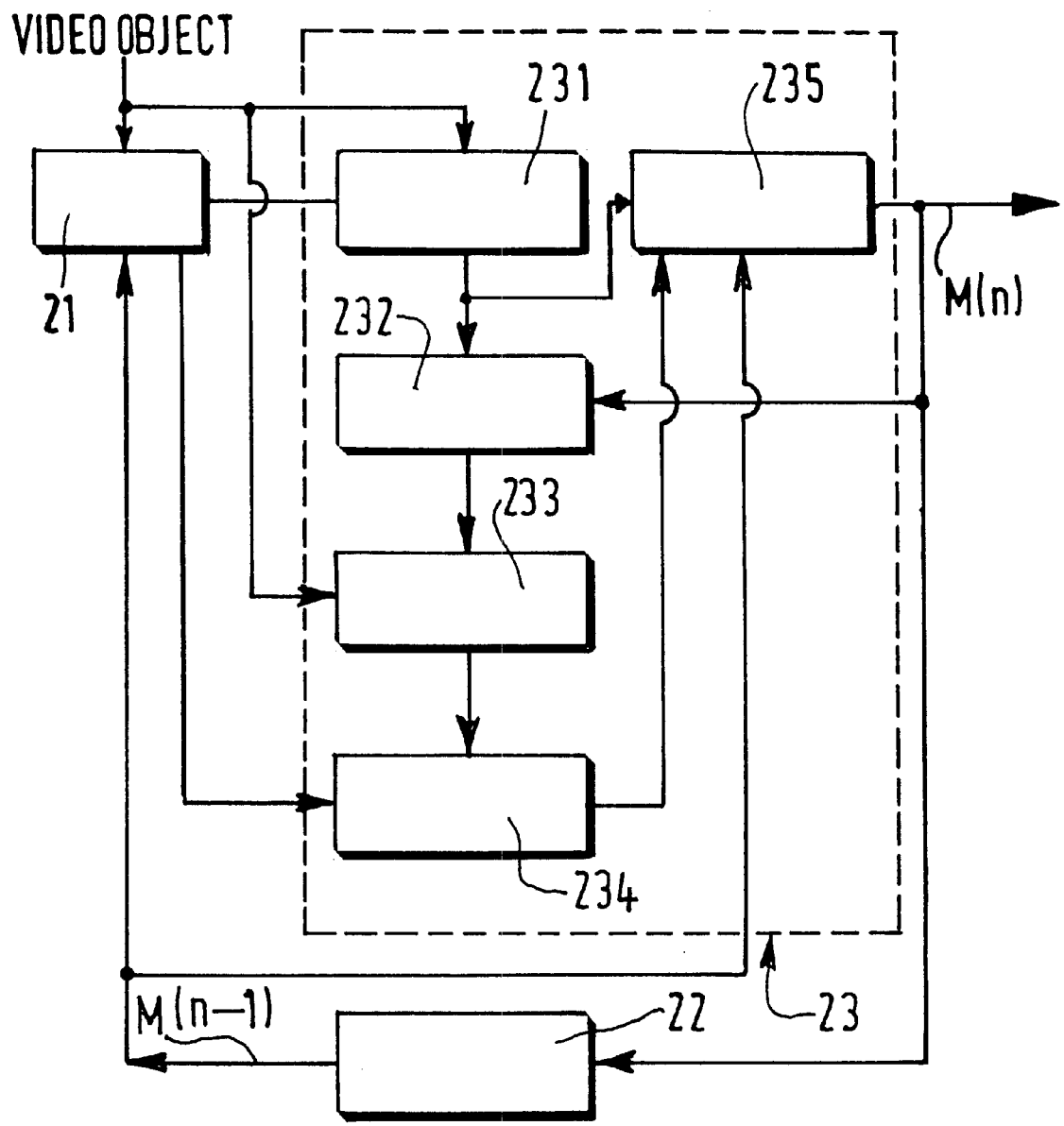
FIG. 2 shows an implementation of a static image generation device according to the invention.

A device for the implementation of the method according to the invention in the case of a mosaic is illustrated in FIG. 2. As previously, a motion estimation stage 21 identical to the stage 11, receives the successive frames F(1), F(2), F(3), ..., F(i), ..., F(n-1), F(n). A mosaic accretion stage 23 then allows to build the new mosaic M(n) refreshing the previous one (M(n-1)) available in a memory 22.

Once the motion estimation has been carried out as previously described in the already cited European patent application, the mosaic accretion stage 23 allows to warp the current frame F(n) and blend it with the mosaic. This stage 23 comprises the following circuits: a warping circuit 231, an error map definition circuit 232, a spatial segmentation circuit 233, a coefficient computation circuit 234 and a blending circuit 235. The circuits 231, 232 and 235 are identical to the corresponding circuits 131, 132 and 135.

Figure 1:
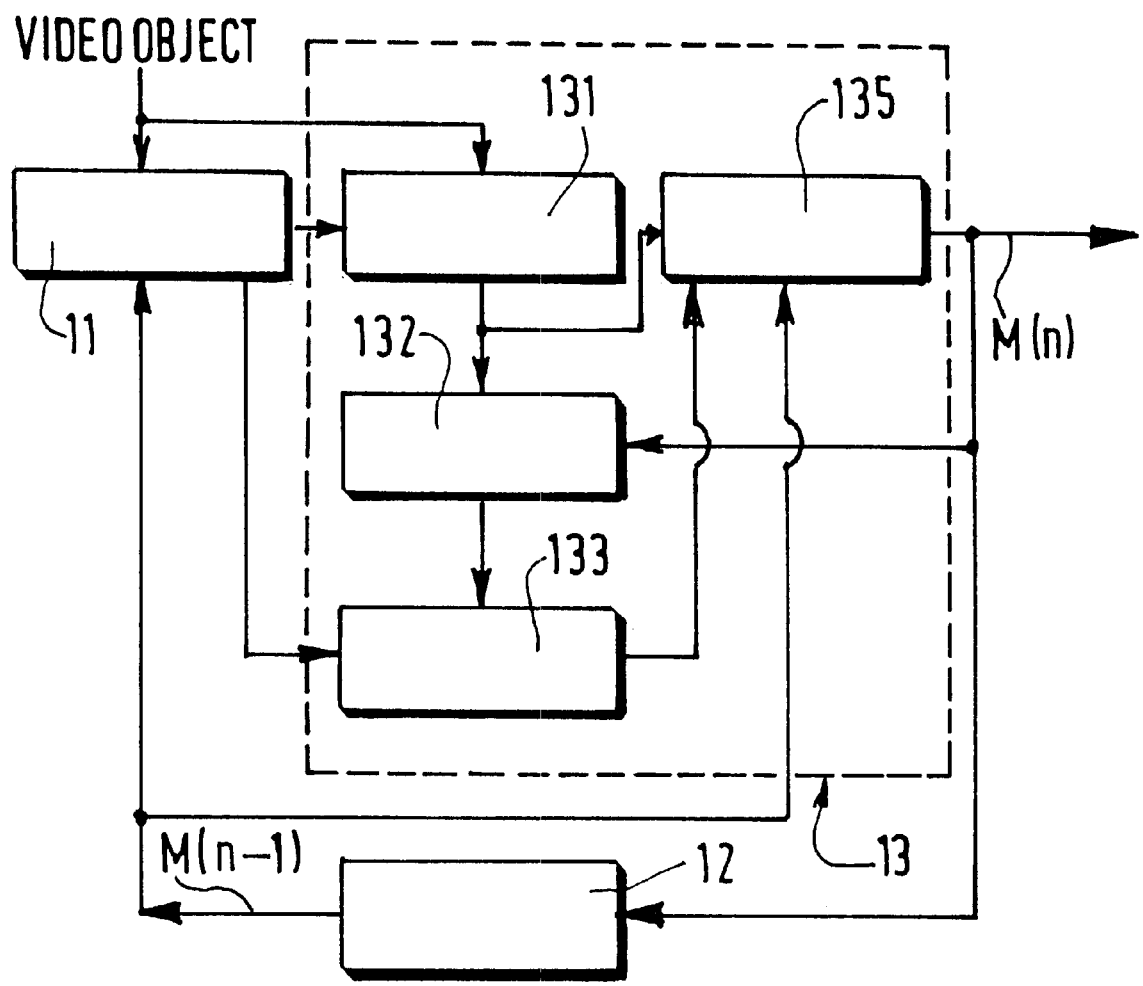
FIG. 1 shows a scheme of a previous static image generation device.

In FIG. 1, the pixel-based weighting circuit was computing for every picture element (pixel) a weighting coefficient $W_{WF(n)}$, given by the expression (2) (the construction of the whole error map was done in the error map definition circuit 132 and the subsequent computation of the weighting coefficients in the coefficient computation circuit 133). According to the invention, a spatial segmentation sub-step, based on morphological mathematics, is now added after the circuit 232 implementing the construction of the error map. This additional sub-step, carried out in a spatial segmentation circuit 233, transforms the original pixel-based error map into a region-based weight map which allows to detect regions that belong to foreground objects and to discard them efficiently when blending the current frame F(n) with the mosaic M(n-1). Since the error map is pixel-based, some objects are indeed not well detected as foreground since only some of their pixels are considered as outlier information. The addition of the spatial preprocessing sub-step carrying out a morphological segmentation allows, thanks to the segmentation of the image into regions, to detect the outliers zones and to discard them.

This segmentation method, based on connected operators and allowing to filter the pixel-based outliers map into an objects-based outliers map, is described for instance in the document U.S. Pat. No. 5,867,605(PHF96629). The advantage of that class of morphological mathematics operators, working here on a hierarchically structured tree representation of the image made of flat zones (completed, after detection of the uniform areas, by a labeling step based on the error map information and followed by the implementation of a Viterbi algorithm pruning the tree and making the decision of weighting regions), is that, by merging the flat zones without deteriorating object boundaries, the image is simplified while preserving the contour information (the components that are not removed are perfectly preserved). In the present case, the image is the luminance component of the video frames, but the method also works on other transformations of these frames.

What is claimed is:

1. A method for generating a large static image M(n), such as a sprite or a mosaic, from a video sequence including successive video objects VOs, said method comprising the steps of:

(A) estimating motion parameters related to the current video object V0(n) of the sequence, with respect to the previously generated static image M(n-1);

(B) warping said current video object V0(n), on the basis of said estimated motion parameters;

(C) blending the warped video object WV0(n) thus obtained with the previously generated static image M(n-1); characterized in that:

(1) said method also comprises, between said warping and blending steps, an additional step itself including:

a first pixel-based error map definition sub-step, provided for constructing, for each picture element of the current video object V0(n), a map of the error r(x, y) between the warped video object WV0(n) and the static image M(n-1) at said picture element [x,y];

a second spatial filtering sub-step, provided for transforming said pixel-base error map into a region-based error map;

a third weighting sub-step, provided for computing for every pixel a weighting coefficient $W_{WF(n)}$ [x,y] correlated to said error and in the same time for selecting regions that belong to foreground objects and discarding them as outliers before the blending step;

(2) wherein the blending step takes into account said weighting coefficients according to a blending formula for determining the static image M(n), the blending formula being defined as follows for each pixel [x,y]:

$$M(n)[x, y] = \frac{{}^wM(n-1)[x, y] \cdot M(n-1)[x, y] + {}^wWF(n)[x, y] \cdot WF(n)[x, y]}{{}^wM(n-1) + {}^wWF(n)}$$

where the definitions of the terms are the following:
(a) n>0;
(b) whatever (x,y), $W_{M(0)}=0$;

(c) whatever (x,y), $$w_{WF(n)}[x, y] = \frac{1}{r(x, y)} \frac{d}{dr}\rho(r(x, y));$$

d) $W_{M(n)} = W_{M(n-1)} + W_{WF(n)}$;
ρ being a lorentzian M-estimator used in the motion estimation step.

2. A method according to claim 1, characterized in that said spatial filtering sub-step is based on a morphological segmentation.

3. A device for generating a large static image M(n), such as a sprite or a mosaic, from a video sequence including successive video objects VOs, said device comprising:
(A) a motion estimation circuit, provided for estimating a motion information related to the relative motion between the current video object of the sequence and the previously generated static image M(n−1);
(B) a warping circuit, provided for defined on the basis of said current video object and said motion information a warped video object WV0(n);
(C) a blending circuit, provided for updating the static image, said previously generated static image M(n−1) being replaced by the new one M(n) generated by blending M(n−1) and said warped video object; characterized in that:
(1) said device also comprises a region-based weighting circuit, receiving the current video object and the associated motion information and itself including:
a pixel-based error map definition circuit, provided for constructing, for each picture element (x, y) of said current video object, a map of the error r(x, y) between the warped video object and the previous static image M(n−1) at said picture element [x,y];
a spatial filtering circuit, provided for transforming said pixel-based error map into a region-based error map;
a weighting circuit, provided for computing for every pixel a weighting coefficient $W_{WF(n)}[x,y]$ correlated to said error and in the same time for selecting regions that belong to foreground objects and discarding them as outliers before the blending step;
(2) wherein the blending circuit takes into account the computed weighting coefficients according to a blending formula for determining the static image M(n), the blending formula being defined as follows for each pixel [x,y];

$$M(n)[x, y] = \frac{{}^wM(n-1)[x, y] \cdot M(n-1)[x, y] + {}^wWF(n)[x, y] \cdot WF(n)[x, y]}{{}^wM(n-1) + {}^wWF(n)}$$

where the definitions of the terms are the following:
(a) n>0;
(b) whatever (x,y), $W_{M(0)}=0$;
(c) whatever (x,y), $$w_{WF(n)}[x, y] = \frac{1}{r(x, y)} \frac{d}{dr}\rho(r(x, y));$$

(d) $W_{M(n)} = W_{M(n-1)} + W_{WF(n)}$;
ρ being a lorentzian M-estimator used in the motion estimation circuit.

* * * * *